United States Patent
Witwer et al.

(10) Patent No.: US 11,427,468 B2
(45) Date of Patent: Aug. 30, 2022

(54) INTEGRATED HYDROGEN GENERATOR AND COMPRESSOR WITH RELATED METHOD

(71) Applicant: ONBOARD DYNAMICS, INC., Bend, OR (US)

(72) Inventors: Jeffrey G. Witwer, Bend, OR (US); Steven D. Westberg, Bend, OR (US)

(73) Assignee: Onboard Dynamics LLC, Bend, OR (US)

( * ) Notice: Subject to any disclaimer, the term of this patent is extended or adjusted under 35 U.S.C. 154(b) by 373 days.

(21) Appl. No.: 16/500,931

(22) PCT Filed: Mar. 29, 2018

(86) PCT No.: PCT/US2018/024999
§ 371 (c)(1),
(2) Date: Oct. 4, 2019

(87) PCT Pub. No.: WO2018/187136
PCT Pub. Date: Oct. 11, 2018

(65) Prior Publication Data
US 2020/0048087 A1 Feb. 13, 2020

Related U.S. Application Data (60) Provisional application No. 62/482,618, filed on Apr. 6, 2017.

(51) Int. Cl.
*C01B 3/38* (2006.01)

(52) U.S. Cl.
CPC ........ *C01B 3/38* (2013.01); *C01B 2203/0233* (2013.01); *C01B 2203/0811* (2013.01); *C01B 2203/1241* (2013.01)

(58) Field of Classification Search
CPC .............. C01B 3/38; C01B 2203/0233; C01B 2203/0811; C01B 2203/1241; Y02P 20/129
See application file for complete search history.

(56) References Cited

U.S. PATENT DOCUMENTS

| | | | | |
|---|---|---|---|---|
| 4,425,876 A | * | 1/1984 | Rutledge | F02G 5/00 123/3 |
| 5,400,751 A | * | 3/1995 | Grimmer | F16F 15/32 123/192.2 |

(Continued)

FOREIGN PATENT DOCUMENTS

| | | | |
|---|---|---|---|
| WO | 2004091970 A1 | 10/2004 | |
| WO | WO-2004091970 A2 * | 10/2004 | ............... F17C 5/06 |

OTHER PUBLICATIONS

Johnson et al. "Advancements and Opportunities for On-Board 700 Bar Compressed Hydrogen Tanks in the Progression Towards the Commercialization of Fuel Cell Vehicles" 2017, SAE international journal of Alternative Powertrains, vol. 6, No. 2, p. 1-4 (Year: 2017).*

(Continued)

*Primary Examiner* — Steven J Bos
*Assistant Examiner* — Syed T Iqbal
(74) *Attorney, Agent, or Firm* — Leber IP Law; Shelly M. Fujikawa (57) ABSTRACT

An integrated hydrogen generator and compressor (200) that includes a combined engine compressor (collectively 109, 110, 111) and steam-methane reformer (104) to produce high-pressure hydrogen from natural gas (methane). The reformer (104) combines methane, water, and heat under high pressure in the presence of an appropriate catalyst, to produce hydrogen utilizing waste heat from combustion cylinders of the combined engine compressor (collectively 109, 110, 111). Compression serves to pressurize two dif- (Continued)

ferent gases (methane and hydrogen) in different compression cylinders including the compression cylinders (109*a*, 109*b*, 109*c*) of the combined engine compressor (collectively 109, 110, 111) alternatively and/or optionally combined with internal combustion engine (310) and/or gas compressor(s) (410) that are integrated thermally and via communication of compressed gases.

15 Claims, 5 Drawing Sheets

(56) References Cited

U.S. PATENT DOCUMENTS

| | | | |
|---|---|---|---|
| 6,821,501 | B2 | 11/2004 | Matzakos et al. |
| 7,041,272 | B2 | 5/2006 | Keefer et al. |
| 7,261,064 | B2 | 8/2007 | Bhaisora et al. |
| 2002/0098394 | A1* | 7/2002 | Keefer .................. B01D 53/06 423/651 |
| 2003/0068269 | A1* | 4/2003 | Matzakos ............... C01B 3/501 423/652 |
| 2006/0070587 | A1* | 4/2006 | Bhalsora ................ F02M 25/10 123/3 |

OTHER PUBLICATIONS

International Patent Application No. PCT/2018/024999, International Search Report and Written Opinion dated Jun. 6, 2018.

Johnson et al., "Advancements and Opportunities for On-Board 700 Bar Compressed Hydrogen Tanks in the Progression Towards the Commercialization of Fuel Cell Vehicles", SAE International Journal of Alternative Powertrains, vol. 6, No. 2, Mar. 28, 2017, 4 pages.

* cited by examiner

INTEGRATED HYDROGEN GENERATOR AND COMPRESSOR WITH RELATED METHOD

STATEMENT REGARDING FEDERALLY SPONSORED RESEARCH OR DEVELOPMENT

This invention was made with government support under DE-AR0000490 awarded by the U.S. Department of Energy. The government has certain rights in the invention.

BACKGROUND

Alternatives to petroleum-based fuels for typical internal combustion (IC) engines has given rise to the development of fuel cell electric vehicles. Such vehicles are highly-efficient and may be powered by domestically-produced hydrogen fuel. Hydrogen fuel cell vehicles are zero emission and run on compressed hydrogen fed into a fuel cell "stack" that produces electricity to power the vehicle. Thus, a hydrogen fuel cell may be used in combination with an electric motor to drive a vehicle quietly, powerfully and cleanly. However, for effective use as a vehicle fuel, hydrogen gas must be compressed to a high pressure (typically around 10,000 psi).

Hydrogen production is one important issue related to hydrogen fuel cell technology in terms of creating high quality hydrogen gas in a cost-effective and safe manner. There are several methods in common practice to produce elemental hydrogen.

Most hydrogen produced today in the United States is made via steam-methane reforming (SMR), a mature production process in which high-temperature steam (700° C.-1,000° C.) is used to produce hydrogen from a methane source, such as natural gas. In SMR, methane reacts with steam under 3-25 bar pressure (1 bar=14.5 psi) in the presence of a catalyst to produce hydrogen, carbon monoxide, and a relatively small amount of carbon dioxide. Steam reforming is endothermic—that is, heat must be supplied to the process for the reaction to proceed.

Subsequently, in what is called the "water-gas shift reaction," the carbon monoxide and steam are reacted using another catalyst to produce carbon dioxide and more hydrogen. In a final process step called "pressure-swing adsorption," carbon dioxide and other impurities are removed from the gas stream, leaving essentially pure hydrogen. Steam reforming can also be used to produce hydrogen from other fuels, such as ethanol, propane, or even gasoline.

SMR reaction is provided for by the following equation.

$$CH_4 + H_2O(+\text{heat}) \rightarrow CO + 3H_2 \qquad \text{Eq. 1}$$

Water-gas shift reaction is provided by the following equation.

$$CO + H_2O \rightarrow CO_2 + H_2(+\text{small amount of heat}) \qquad \text{Eq. 2}$$

In the following sections, for brevity and is common practice, we will use the term "reformer" to collectively refer to a single subsystem in which the two discrete reactions of equations 1 and 2 serially occur.

Reforming low-cost natural gas to produce hydrogen in this manner may provide commercial hydrogen production capacity needed to support a full fleet of fuel cell electric vehicles (FCEVs). Producing hydrogen from natural gas does result in the emission of greenhouse gases, as shown in the chemical reactions above. However, when compared to internal combustion engine vehicles using gasoline, FCEVs using hydrogen produced from natural gas reduce greenhouse gas emissions. Furthermore, because the $CO_2$ that is produced is relatively pure and at a stationary location, its capture for use or sequestration is more feasible.

Reformers are not without inherent inefficiencies. Because the essential catalytic reaction converting methane to hydrogen is endothermic, some of the incoming stream of methane is commonly consumed to provide the required reaction energy. As a result, the produced hydrogen contains only 65 to 75% of the energy that was in the original inflowing stream of methane.

Reformers may also present concerns related to scaled production in that cost is prohibitive at small scale. As one of the most attractive uses of hydrogen would be to provide the energy for FCEVs, it would be desirable to refuel such vehicles at conveniently located refueling stations that are as ubiquitous as current automotive gasoline stations. As previously mentioned, hydrogen used as a vehicle fuel must be highly compressed (typically to 10,000 psi) due to its low volumetric energy density at atmospheric pressure. Unfortunately, both reformer systems and high-pressure gas compressors have traditionally been very expensive at the size that would be required for local hydrogen refueling stations.

There are several known approaches to provide high-pressure hydrogen for local refueling of vehicles. These include direct delivery of high-pressure hydrogen, delivery of liquefied hydrogen, and local production of hydrogen. Each approach has challenges.

Direct delivery of high-pressure hydrogen to local storage tanks may be accomplished via tank truck. In this system, hydrogen is produced at a large-scale facility, usually either via reforming or electrolysis. It is then pressurized and added to a large capacity tank trailer for delivery to local dispensing stations. At a dispensing station, the hydrogen is transferred into another high-pressure tank storage system from which it is dispensed on demand into the storage tank of a fuel cell vehicle. There are numerous problems with this delivery system related to its multiple steps with high-pressure tank systems. Each tank system is expensive. The transfer between each tank system involves a necessary loss in pressure, albeit mitigated by a complex cascading of tanks. Finally, this system involves the safety and cost concerns of over the road shipment of high-pressure hydrogen, commonly in congested urban areas in which these stations would be located.

A second approach is similar to that described above, but with the hydrogen being delivered via truck as liquefied hydrogen. In this scenario, the hydrogen is again produced at a central facility, either via reforming or electrolysis, but instead of being compressed to high pressure, it is chilled to low temperature (−423° F.), at which point it becomes a liquid. This liquid is transported in a cryogenic tank truck to local refueling stations where it is transferred to another cryogenic tank at each station. When needed for refueling, this liquid hydrogen is then vaporized by adding heat from some local source (e.g., by burning some of the hydrogen or locally available natural gas) and then compressed to high pressure for subsequent dispensing into a vehicle. This system is problematic in that the initial liquification process is expensive and consumes considerable energy, while the re-vaporization process further consumes more energy. Still further, the final compression step is expensive and consumes more energy (about 10%). Typical high pressure compressors are not attractive even at modest sizes. Finally, this system also involves the transport of hydrogen, liquefied in this case, via trucks through urban areas.

A third approach involves producing the hydrogen locally at the refueling station either via electrolysis or via reforming utilizing natural gas from the local gas utility. This approach eliminates concerns over shipping hydrogen, either liquid or compressed, via truck through urban areas. However, its challenge is that neither hydrogen production nor the required compression to 10,000 psi are cost effective at the size required by a local refueling station.

Generally speaking, compression of gas may be accomplished in a variety of ways. One such manner of gas compression related to natural gas compressors is shown by U.S. Pat. No. 5,400,751 which is incorporated by reference herein and illustrated by simplified prior art FIG. 1.

Figure 1:
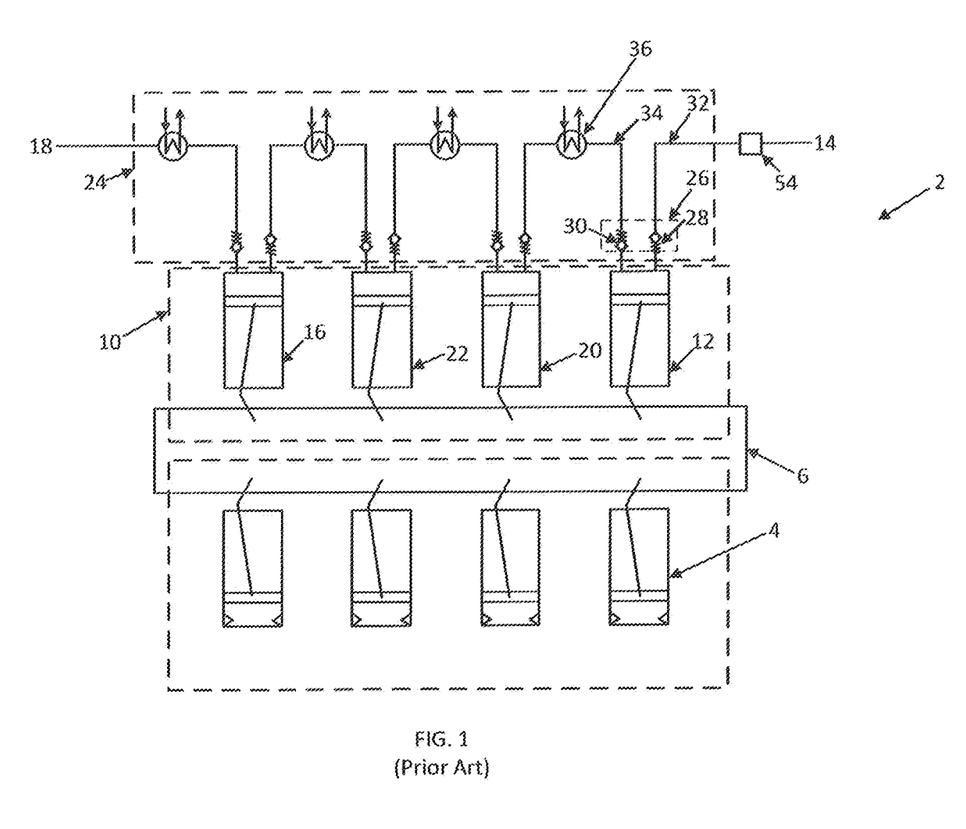
FIG. 1 is a schematic showing a four-cylinder gas compression system incorporated within a V8 engine in accordance with the prior art.

In FIG. 1, a four-cylinder gas compression system to compress natural gas for vehicle fuel is shown. The gas compressor (shown collectively as cylinder head 24 and a plurality of compression cylinders 10 in FIG. 1) is part of an internal combustion engine 2 containing the plurality of compression cylinders 10, at least one standard combustion cylinder 4 to drive the plurality of compression cylinders 10, and a common crankshaft 6 coupling the plurality of compression cylinders 10 and the at least one standard combustion cylinder 4. The plurality of compression cylinders 10 are in fluid communication with each other, and are configured to compress gas in a series of stages. The plurality of compression cylinders 10 includes an initial compression cylinder 12 in fluid communication with a gas inlet 14, a final compression cylinder 16 in fluid communication with a gas outlet 18, and optional intermediate compression cylinders, such as intermediate compression cylinders 20 and 22. A cylinder head 24 includes a valve system 26 to direct the flow of gas into and out of the compression cylinders. The flow of gas into a compression cylinder may be regulated using a check valve, e.g., check valve 28. The flow of gas out of a compression cylinder may be regulated using a check valve, e.g., check valve 30. Pressure regulator 54, disposed between gas inlet 14 and initial compression cylinder 12, ensures that the gas pressure from gas inlet 14 does not exceed the design limits for the maximum inlet pressure of initial compression cylinder 12.

As shown in FIG. 1, during a gas compression cycle, gas travels from gas inlet 14 to initial compression cylinder 12 via a conduit 32 passing through regulator 54 and check valve 28. Initial compression cylinder 12 compresses the gas. Compression of the gas causes the gas to heat. Check valve 30 allows the heated compressed gas to flow out of initial compression cylinder 12. As the heated gas passes to another compression cylinder for further compression via a conduit, e.g., compression cylinder 20 via conduit 34, a cooling system, e.g., cooling system 36, cools the gas. Cooling the gas reduces the energy required for compression. The gas is serially compressed via optional intermediate compression cylinders 20 and 22 until the gas leaves final compression cylinder 16, is cooled, and travels to gas outlet 18.

Heretofore, no suitable mechanism exists for efficient and cost-effective production of hydrogen gas in a moderately sized, volume produced apparatus provided at the refueling location. What is needed is a solution to accomplish such desired features.

SUMMARY

The present invention provides an apparatus and related method for efficient and cost-effective production of hydrogen gas in a moderately sized, volume produced manner locatable at the refueling location by way of integrating a reformer with a compressor. In doing so, the present invention lowers the cost and carbon footprint of providing high-pressure hydrogen that may be used in applications such as FCEVs, at a scale compatible with widespread refueling locations.

In a first aspect, the present invention involves an integrated hydrogen generator and compressor apparatus, the apparatus including: a steam-methane reformer; a gas compressor coupled to the steam-methane reformer, the gas compressor including a first compressor in fluid communication with a gas inlet of the steam-methane reformer and configured to compress a first gas, a second compressor in fluid communication with a gas outlet of the steam-methane reformer and configured to compress a second gas received from the gas outlet; a plurality of combustion cylinders in fluid communication with each other and configured to operate via combustion of the first gas; and wherein the steam-methane reformer is coupled to the plurality of combustion cylinders to receive heat created by the combustion of the first gas, the first gas being methane and the second gas being hydrogen.

In a first aspect, the present invention involves a method of hydrogen production using an integrated hydrogen generator and compressor, said method including: receiving a low-pressure methane gas provided at or near a pressure of 10 psi; increasing pressure of the methane gas by way of a first compressor to form a high-pressure methane gas at or near a pressure of 200 psi; reforming the high-pressure methane gas to a low-pressure hydrogen gas at or near a pressure of 300 psi using waste heat provided by one or more combustion cylinders connected to the compressor; and increasing pressure of the low-pressure hydrogen gas by way of a second compressor to form a high-pressure hydrogen gas at or near a pressure of 10,000 psi.

DETAILED DESCRIPTION

The invention will now be discussed in terms of the embodiment shown in FIG. 2 which shown an integrated generator-compressor 200, or IGC. It should be noted that the illustration shown may include additional elements not shown but which are well within the understanding of one of ordinary skill in the art. Such additional elements not shown may include, without limitation, any necessary valves, cylinder firing and timing equipment, and conduits to enable the present invention to function as described hereinbelow. For clarity, such details have been omitted.

The present invention builds upon the known device of FIG. 1 which is shown using an automotive engine to compress a gas. Such concept is referred to as a combined engine compressor, or CEC, which modifies one bank of a V-block engine to function as a compressor and the other, unmodified bank to provide the power for that compression. In terms of the present invention and with regard to the inventive IGC 200 shown in FIG. 2, a CEC is shown collectively as compression bank 109 including four cylinders serving a compression function, combustion bank 11 including four cylinders serving a combustion function, and a crankshaft 110 mechanically coupling the compression and combustion cylinders.

In accordance with the present invention, the IGC 200 includes a CEC (collectively 109, 110, 111) which is in fluid communication with a reformer 104. The reformer itself is a typical design for known steam-methane reformer devices such that details are available to one of ordinary skill in the art and not discussed herein. In general, a steam-methane reformer is a device understood by the trade, which combines methane, water, and heat under high pressure in the presence of an appropriate catalyst, to produce hydrogen and by-product $CO_2$. Many such hydrogen forming processes are known to the art and would be applicable for use in this invention, and the details of the reformer are therefore not explicitly described herein as they are well known devices regarding the steam-methane reforming reaction and the water-gas-shift reaction which are two known reactions advantageously suited for the process of this invention. However, one possible example of such steam-methane reformer is as shown in U.S. Pat. No. 6,881,394 incorporated herein by reference in its entirety. The present invention extends that concept to integrate such a CEC with a reformer to produce high-pressure hydrogen from natural gas (methane).

Figure 2:
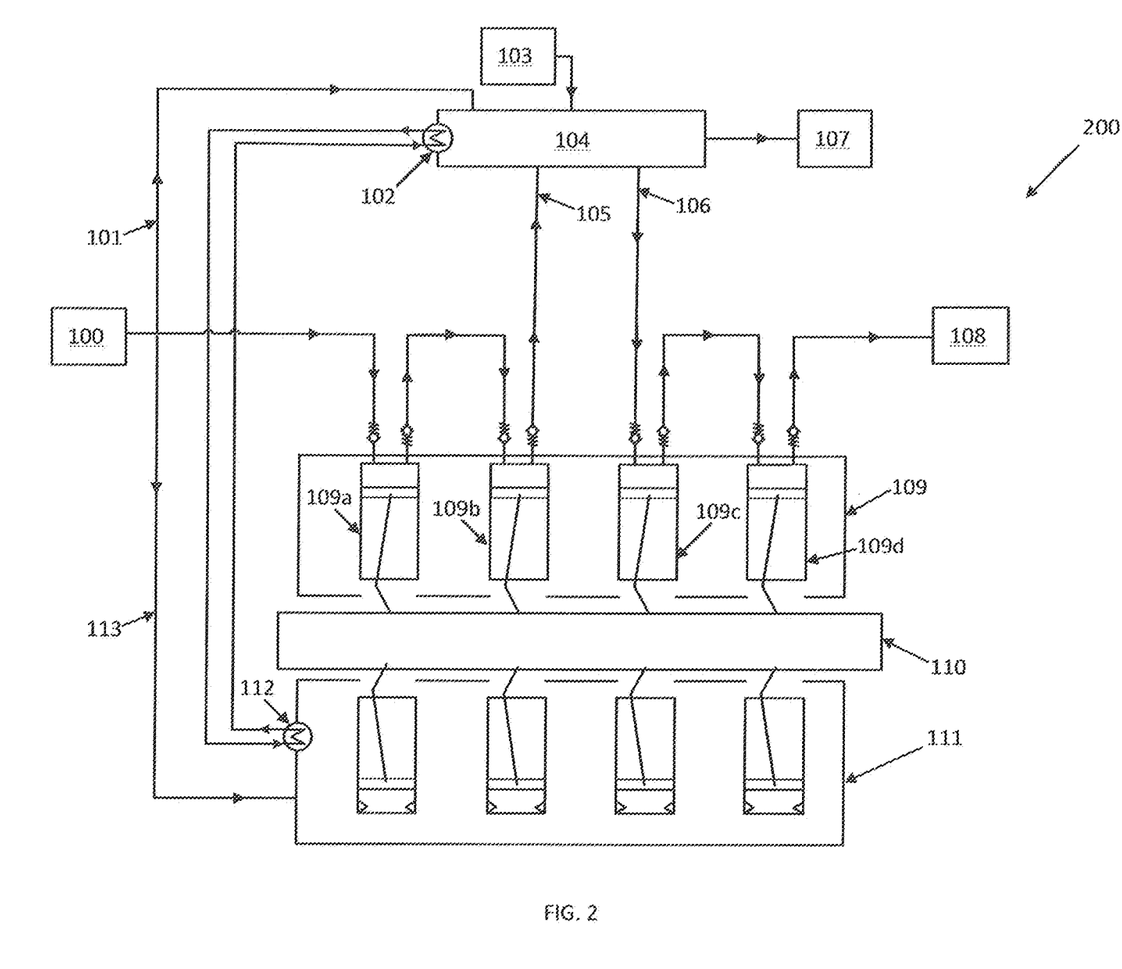
FIG. 2 is a schematic showing an integrated reformer and combined engine compressor in accordance with the present invention.

With continued reference to FIG. 2, a source of natural gas 100 is provided at an input side of the IGC 200. A reformer supply line 101 is provided to supply the reformer 104 with methane for heat purposes. Likewise, a combustion supply line is provided to supply the combustion bank 111 with fuel for motive purposes in the known manner of an internal combustion engine structure and function.

It should be understood that as required by the composition of natural gas at an individual site, a standard natural gas conditioning unit (drying, filter, pressure regulator, meter, etc.) might or might not be located upstream of the entire system described here—i.e., conditioning may be provided prior to the source of natural gas 100.

Compression bank 109 includes four compression cylinders 109a, 109b, 109c, and 109d as shown. The compression cylinders are motively driven by the cylinders of the combustion bank 111 via the mechanically coupled crankshaft 110. The compression cylinders are configured in two stages. In the first stage, methane provided by the source of natural gas 100 enters a first compression cylinder 109a in order to increase the gas pressure (to, for example 100 to 200 psi). Depending upon the design of the individual system which may deviate from the exemplary version shown in FIG. 2 without straying from the intended scope of the present invention, this same methane will next pass to a second compression cylinder 109b in the compression bank 109 to increase it pressure further (e.g., to 150 to 400 psi) as required by design of the specific the SMR process used by reformer 104. Once pressurized, the methane is routed to the reformer 104 at methane inlet 105.

A source of water 103 is provided in fluid communication with the reformer 104. The water in the reformer 104 is increased in temperature to the point of steam production. The heating source for such temperature increase is fueled by methane via reformer supply line 101 as well as being fueled by waste heat from combustion bank 111. As shown, this may be accomplished by heat exchangers 102 and 112 which transfer heat between the reformer 104 and combustion bank 111, respectively.

Although the heat exchangers 102 and 112 are shown in simplified form within FIG. 2, it should be understood however that the heat exchangers may take one or more differing forms. As well, there may optionally be differing heat transfer loops taken alone or together in combination with differing forms of heat exchangers. A first type of heat transfer configuration may include heat transfer via liquid engine coolant from the cooling jacket of the combustion bank 111 which may range from 100° C. to 130° C. for heat transfer to the reformer 104. A second type of heat transfer configuration may include taking heat from the exhaust of the combustion bank 111 which may range to about 700° C. transfers this heat to the reformer 104. The waste heat transferred from the IC engine in this manner may therefore be provided at differing temperatures thereby allowing the reformer to more fully utilize heat in an optimal manner.

In the reformer 104, the methane, in the presence of a catalyst, reacts with steam to produce hydrogen and $CO_2$. The $CO_2$ is vented to a suitable output mechanism 107. It should be noted that because the present invention utilizes waste heat from the coolant jacket and/or exhaust of the combustion bank 111 of the integral IC engine to drive the SMR reaction, less heat energy is required from methane via reformer supply line 101. This advantageously thereby reduces the overall release of $CO_2$, a greenhouse gas.

The output mechanism 107 may be the atmosphere or some other capture device which provides captured $CO_2$ for other uses or sequestration. The hydrogen produced by the reformer 104 is routed from hydrogen outlet 106 to the compression bank 109 of the CEC where it is compressed, in one, two, or three stages (depending on a particular design), from the operating pressure of the reformer to a pressure suited for vehicular use (e.g., 10,000 psi). As shown, hydrogen compression in FIG. 2 is a two-stage arrangement to step up the hydrogen pressure using compression cylinder 109c in series with compression cylinder 109d. Upon exiting compression cylinder 109d, the resultant pressurized hydrogen is provided to a suitable hydrogen repository 108. The hydrogen repository may be any form of local storage or fueling station point of use devices.

It should be understood that while FIG. 2 illustrates four compression cylinders and four combustion cylinders in terms of a single IC engine of a V8 type configuration, the number of each such cylinders may vary in accordance with the given implementation of the present invention without straying from the intended scope. Specifically, the number of compression and combustion cylinders need not be four and four. As such, five stages may be required by a given implementation such that the CEC (collectively 109, 110, 111) may be formed by a readily available V10 IC engine. Rather, they may, for example, be five and five or three and three. As well, if the total number of compressing cylinders is four, they need not be split only as two for compressing methane and two for compressing hydrogen, but instead they may be allocated as one and three cylinders for either gas. Accordingly, it should be readily apparent that any combination of compression stages may be provided in accordance with the present invention.

It should further be understood that the CEC need not be restricted to a single V-block engine. Rather, the compression bank and the combustion bank could be derived from separate engine blocks not sharing a common crankshaft and with cylinders of whatever number suited the design requirements of a particular reformer. Additionally, an IC engine may be provided solely for the purposes of providing heat and power. A variety of combinations may therefore be possible in terms of IC engines of varying number of cylinders and for varied function. Such configurations may include, without limitation: one or more separate CECs each providing power, heat, and compression stages; one IC engine for power and heat in combination one or more separate CECs for compression stages; one IC engine for power and heat in combination with a typical gas compressor; or any combination thereof.

Figure 3:
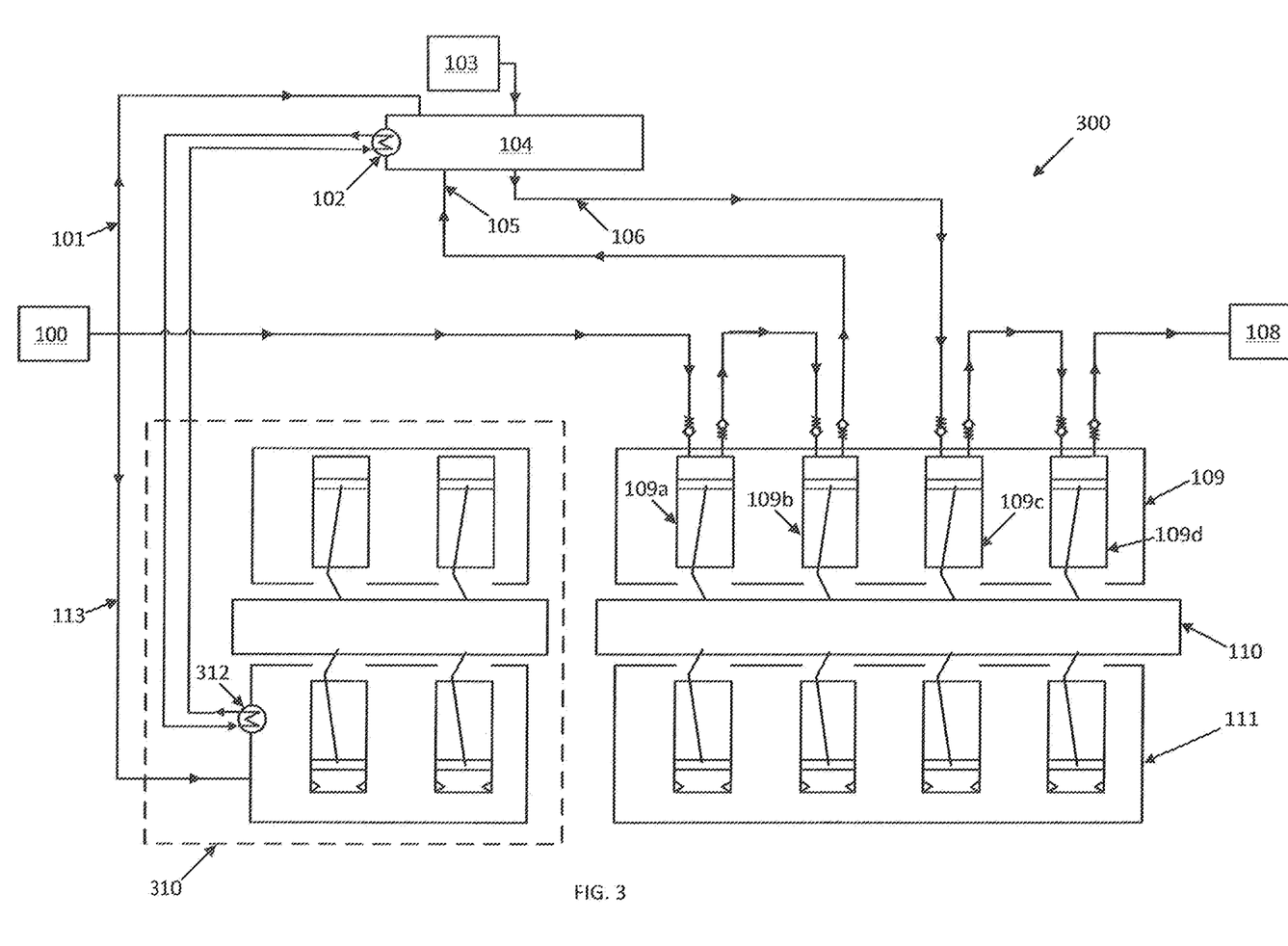
FIG. 3 is a schematic showing an integrated reformer and combined engine compressor further incorporating a four-cylinder engine in accordance with another embodiment of the present invention.

For purposes of further illustrating one alternative implementation of the present invention, FIG. 3 is provided showing another possible embodiment 300 including a four-cylinder (e.g., V4) IC engine 310 in combination with the CEC (collectively 109, 100, 111) and reformer 104. Here, the IC engine 310 is shown to provide heat to the reformer 104 via heat exchanger 312. As previously noted, the heat exchanged is waste heat which may be from either the engine coolant or engine exhaust or both. Operation of the embodiment shown in FIG. 3 is therefore identical to that shown in FIG. 2 except that the IC engine 310 is provided for the function of sourcing heat to the reformer 104. The IC engine 310 may also provide power for any suitable system functions as necessary. Again, it should be noted that while a four-cylinder IC engine is shown in combination with an eight cylinder CEC, other configurations may of course be possible without straying from the intended scope of the present invention.

Figure 4:
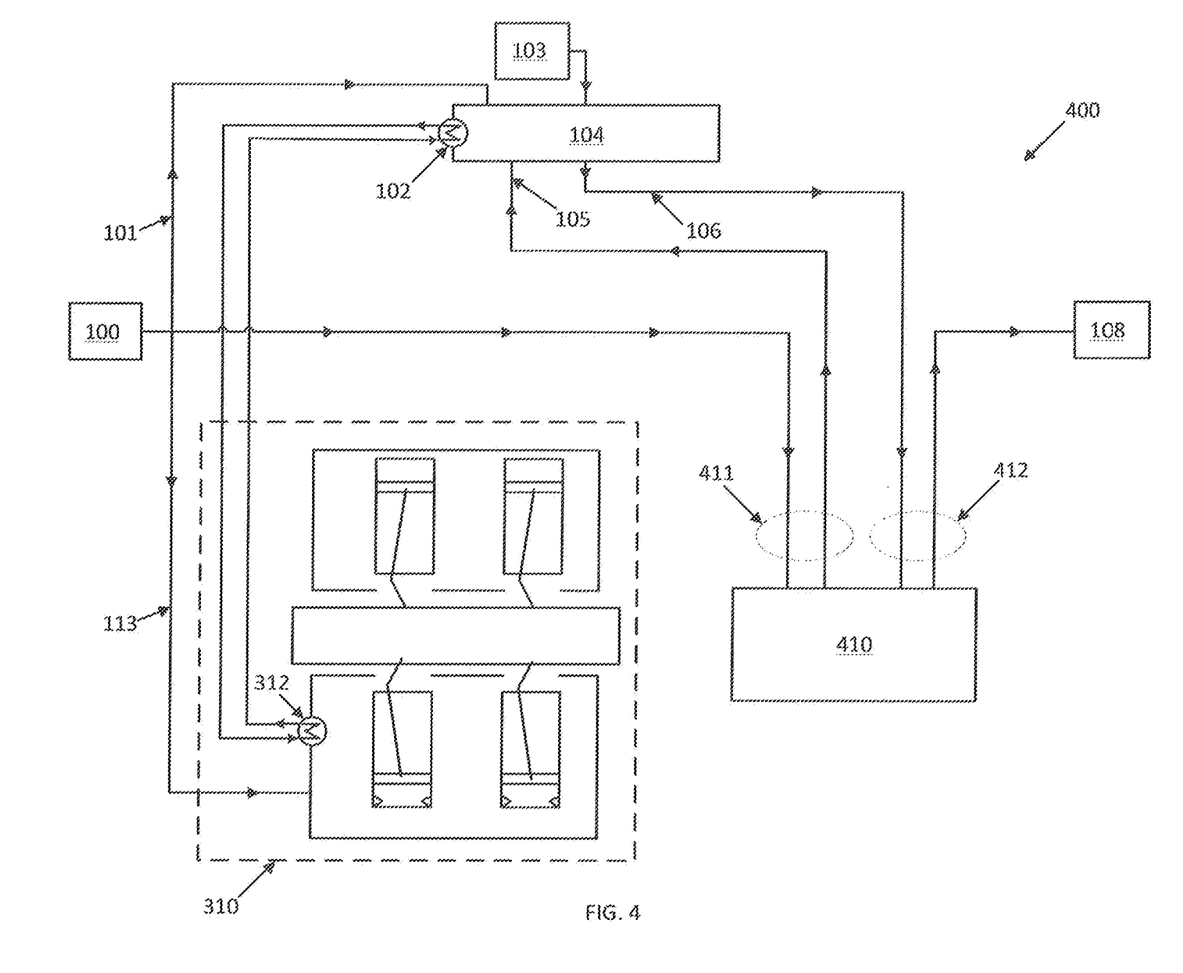
FIG. 4 is a schematic showing an integrated reformer and standard compressor incorporating a four-cylinder engine in accordance with still another embodiment of the present invention.

As further shown by way of FIG. 4, the present invention in terms of an alternative embodiment 400 integrating a hydrogen generator and compressor may be accomplished via an IC engine 310 in combination with a standard gas compressor 410. Indeed, gas compressor 410 may be a single compressor capable of two channel compression 411, 412 or may consist of more than one compressor (not shown). In this instance as shown, the gas compressor 410 includes a first channel 411 dedicated to stepping up the pressure of methane from the methane source 100 and providing the pressurized methane to the reformer 104. Likewise, the gas compressor 410 includes a second channel 412 dedicated to stepping up the pressure of hydrogen from the reformer 104 providing the pressurized hydrogen to the hydrogen repository 108.

Figure 5:
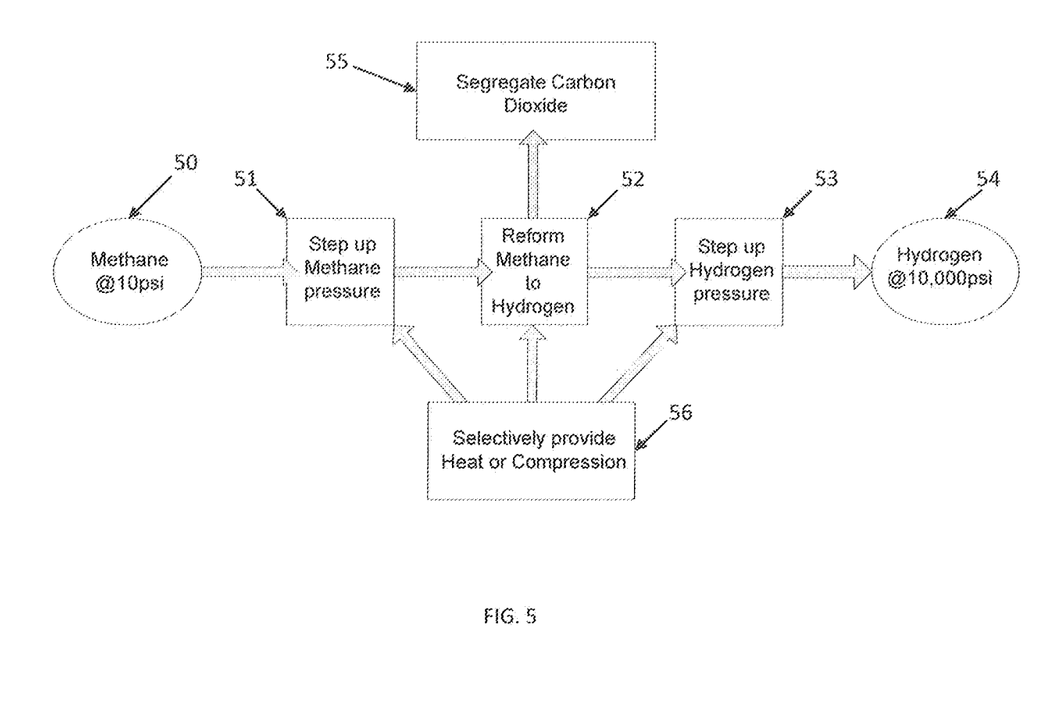
FIG. 5 is a flowchart detailing a method of generating hydrogen from methane via staged compression utilizing an integrated heat source, compressor, and reformer in accordance with the present invention.

The present invention having been thus described herein with regard to the various possible embodiments of the apparatus will now be detailed in terms of the underlying method common to each such embodiment. The flowchart shown in FIG. 5 shows at step 50 that methane is first provided at a relatively low pressure. Such methane pressure would be typically in the range of a natural gas distribution line which commonly operate at pressures ranging between 3 and 30 psi, though some natural gas systems up to 50 psi are possible, and most being between 3 and 20 psi. In conjunction with an integrated compressor in the form of either a CEC or standard compressor selectively providing compression at step 56, the pressure of the methane is stepped up in one or more stages at step 51. The pressurized methane at step 52 then undergoes a reforming process in which the methane, water, and heat under high pressure and in the presence of an appropriate catalyst produces hydrogen and by-product $CO_2$. As previously discussed, the heat provided to the reforming process is waste heat which is selectively provided at step 56 via either a CEC or standard IC engine. At step 55, the by-product $CO_2$ is segregated in some manner, for example, by venting to the atmosphere or stored in some way (i.e., sequestered). In conjunction with the integrated compressor in the form of either a CEC or standard compressor selectively providing compression at step 56, the pressure of the produced hydrogen is stepped up in one or more stages at step 53. Finally, the method results at step 54 in a highly pressurized product in the form of hydrogen provided at 10,000 psi for storage and subsequent end use.

In the manner described above, it should therefore be readily apparent that numerous advantages exist. The present inventive apparatus lower costs due to the integration of both generating and compressing hydrogen. The inventive IGC includes a CEC which itself is based on a volume-produced automotive IC engine. Such integration lowers the cost of compressing both the inlet methane and the produced hydrogen. Heat is recovered from the cooling jacket and/or the exhaust of the CEC to improve the efficiency of the reforming reaction in producing hydrogen from methane. This arrangement lowers the carbon footprint for producing hydrogen from methane because waste heat from the motive power required for compression steps is recovered to drive the reforming process. Advantageously, this invention reduces the need for highway transport of hazardous hydrogen because the hydrogen is produced on site from natural gas that is readily available from existing natural gas distribution pipelines. Still further, the invention provides a scaled device that is compatible with vehicle refueling stations, both those for retail, public access by private vehicles and private fleet yards for trucks.

The present invention is not to be limited in scope by the specific embodiments described herein. Indeed, various modifications of the invention in addition to those described herein will be apparent to those skilled in the art from the foregoing description. Such modifications are intended to fall within the scope of the appended claims.

All references cited herein, including all patents, published patent applications, and published scientific articles and books, are incorporated by reference in their entireties for all purposes.

What is claimed is:

1. An integrated hydrogen generator and compressor apparatus, the apparatus comprising:
   a steam-methane reformer;
   a gas compressor coupled to the steam-methane reformer, the gas compressor including
      a first compressor in fluid communication with a gas inlet of the steam-methane reformer and configured to compress a first gas,
      a second compressor in fluid communication with a gas outlet of the steam-methane reformer and configured to compress a second gas received from the gas outlet;
   a plurality of combustion cylinders in fluid communication with each other and configured to operate via combustion of the first gas; and
   wherein the steam-methane reformer is coupled to the plurality of combustion cylinders to receive heat created by the combustion of the first gas, the first gas being methane and the second gas being hydrogen,
   the plurality of combustion cylinders provides power to the gas compressor.

2. The apparatus as claimed in claim 1, wherein
   the first compressor includes a first plurality of compression cylinders in fluid communication with each other and configured to compress the first gas in one or more stages, including a first initial compression cylinder in fluid communication with a gas inlet and a first final compression cylinder in fluid communication with the steam-methane reformer, and the second compressor includes a second plurality of compression cylinders in fluid communication with each other and configured to compress the second gas in a series of stages, including a second initial compression cylinder in fluid communication with the gas outlet of the steam-methane reformer and a second final compression cylinder in fluid communication with a pressurized-gas outlet.

3. The apparatus as claimed in claim 1, wherein the steam-methane reformer is coupled to a cooling jacket of the plurality of combustion cylinders so as to receive waste heat created by the combustion of the first gas.

4. The apparatus as claimed in claim 1, wherein the steam-methane reformer is coupled to an exhaust of the plurality of combustion cylinders so as to receive waste heat created by the combustion of the first gas.

5. The apparatus as claimed in claim 1, wherein the steam-methane reformer is coupled to both a cooling jacket and an exhaust of the plurality of combustion cylinders so as to receive waste heat created by the combustion of the first gas.

6. The apparatus as claimed in claim 2, wherein both the first plurality of compression cylinders and the second plurality of compression cylinders are mechanically coupled to and driven by the plurality of combustion cylinders.

7. The apparatus as claimed in claim 2, wherein both the first plurality of compression cylinders and the second plurality of compression cylinders are mechanically isolated from the plurality of combustion cylinders.

8. The apparatus as claimed in claim 7, wherein the plurality of combustion cylinders form an internal combustion engine distinct from both the first plurality of compression cylinders and the second plurality of compression cylinders.

9. The apparatus as claimed in claim 8, wherein the internal combustion engine provides power to both the first plurality of compression cylinders and the second plurality of compression cylinders.

10. The apparatus as claimed in claim 1, wherein the plurality of combustion cylinders are mechanically integrated with the gas compressor.

11. The apparatus as claimed in claim 1, wherein the plurality of combustion cylinders are mechanically isolated from the gas compressor.

12. A method of hydrogen production using an integrated hydrogen generator and compressor, said method comprising:

receiving a low-pressure methane gas provided within a range from 3 to 50 psi;

increasing pressure of the methane gas by way of a first compressor to form a high-pressure methane gas at or near a pressure of 200 psi;

reforming the high-pressure methane gas to a low-pressure hydrogen gas at or near a pressure of 300 psi using waste heat provided by one or more combustion cylinders connected to the compressor; and increasing pressure of the low-pressure hydrogen gas by way of a second compressor to form a high-pressure hydrogen gas at or near a pressure of 10,000 psi.

13. The method as claimed in claim 12, further including segregating a carbon dioxide gas obtained by the reforming of the high-pressure methane gas to the low-pressure hydrogen gas.

14. The method as claimed in claim 13, wherein the first and second compressors are powered by the one or more combustion cylinders.

15. The method as claimed in claim 13, wherein the first and second compressors are mechanically coupled to and driven by the one or more combustion cylinders.

* * * * *